United States Patent
Salmenkaita et al.

(10) Patent No.: US 12,355,609 B2
(45) Date of Patent: Jul. 8, 2025

(54) MONITORING OF TARGET SYSTEM, SUCH AS COMMUNICATION NETWORK OR INDUSTRIAL PROCESS

(71) Applicant: Elisa Oyj, Helsinki (FI)

(72) Inventors: Jukka-Pekka Salmenkaita, Helsinki (FI); Rasmus Heikkilä, Helsinki (FI)

(73) Assignee: Elisa Oyj, Helsinki (FI)

( * ) Notice: Subject to any disclaimer, the term of this patent is extended or adjusted under 35 U.S.C. 154(b) by 338 days.

(21) Appl. No.: 18/000,691

(22) PCT Filed: Jun. 2, 2021

(86) PCT No.: PCT/FI2021/050402
§ 371 (c)(1),
(2) Date: Dec. 5, 2022

(87) PCT Pub. No.: WO2021/250313
PCT Pub. Date: Dec. 16, 2021

(65) Prior Publication Data
US 2023/0216726 A1    Jul. 6, 2023

(30) Foreign Application Priority Data
Jun. 11, 2020   (FI) ............................ 20205605

(51) Int. Cl.
*H04L 41/0631* (2022.01)
(52) U.S. Cl.
CPC ........ *H04L 41/0631* (2013.01); *H04L 41/065* (2013.01)

(58) Field of Classification Search
CPC ................... H04L 41/0631; H04L 41/065
(Continued)

(56) References Cited

U.S. PATENT DOCUMENTS 10,148,686 B2 * 12/2018 Hassanzadeh ...... H04L 63/1441
10,924,330 B2 *  2/2021 Sharma ................ H04W 24/04
(Continued)

FOREIGN PATENT DOCUMENTS

DE    102016103521 A1 *  9/2016 ............... G05B 1/01
EP      3648406 A2      5/2020
(Continued)

OTHER PUBLICATIONS

Ankerst et al. "OPTICS: Ordering Points to Identify the Clustering Structure" ACM Sigmod record, 28(2), 1999, 12 pages.
(Continued)

*Primary Examiner* — Melvin H Pollack
(74) *Attorney, Agent, or Firm* — Ziegler IP Law Group

(57) ABSTRACT

A computer implemented method of monitoring and controlling a target system, such as a communication network or an industrial process. The method includes receiving information about anomalies in operation of the target system detected by an automated anomaly detection mechanism; automatically determining certainty characteristics of the detected anomalies; submitting detected anomalies to expert evaluation in priority order determined based on the certainty characteristics; and adjusting the determination of certainty characteristics of the detected anomalies and/or the automated anomaly detection mechanism based on results of the expert evaluation.

20 Claims, 2 Drawing Sheets

(58) Field of Classification Search
USPC .......................................................... 370/216
See application file for complete search history.

(56) References Cited

U.S. PATENT DOCUMENTS

| | | | |
|---|---|---|---|
| 10,969,774 B2* | 4/2021 | Hollender | G05B 13/04 |
| 11,061,393 B2* | 7/2021 | Abe | H04L 41/0631 |
| 11,171,975 B2* | 11/2021 | Vasseur | H04L 41/12 |
| 11,265,205 B2* | 3/2022 | Umakanth | H04L 41/142 |
| 11,398,990 B1* | 7/2022 | Cabrera | H04L 43/0817 |
| 11,415,975 B2* | 8/2022 | Huang | G05B 23/0254 |
| 11,436,647 B1* | 9/2022 | Null | G06Q 10/107 |
| 11,455,554 B2* | 9/2022 | Lohia | G06N 20/20 |
| 11,477,667 B2* | 10/2022 | Cummings | H04L 67/51 |
| 11,496,353 B2* | 11/2022 | Chandrasekhar | G06N 20/20 |
| 11,501,189 B2* | 11/2022 | Tiwari | H04L 63/1425 |
| 11,514,347 B2* | 11/2022 | Dinh | H04L 41/0836 |
| 11,533,326 B2* | 12/2022 | Salunke | G06N 20/10 |
| 11,561,959 B2* | 1/2023 | Marathe | G06F 11/3419 |
| 11,575,697 B2* | 2/2023 | Palani | G06N 3/088 |
| 11,582,249 B2* | 2/2023 | Sternby | H04L 63/1416 |
| 11,599,815 B1* | 3/2023 | Mani | G06N 20/00 |
| 11,605,025 B2* | 3/2023 | Peh | G06Q 10/20 |
| 11,620,157 B2* | 4/2023 | Sriharsha | G06F 16/168 714/25 |
| 11,620,541 B1* | 4/2023 | Ghosh | G06N 5/04 707/600 |
| 11,669,735 B2* | 6/2023 | Shaabana | G06F 11/1476 706/20 |
| 11,671,312 B2* | 6/2023 | Puri | H04L 43/04 709/224 |
| 11,675,799 B2* | 6/2023 | Pierri | G06F 16/2474 714/37 |
| 11,726,982 B1* | 8/2023 | Azam | G06N 3/09 707/690 |
| 11,805,003 B2* | 10/2023 | Mermoud | H04L 41/16 |
| 11,863,409 B2* | 1/2024 | Balaiah | H04L 43/045 |
| 11,929,869 B2* | 3/2024 | Gonigberg | G06F 9/4411 |
| 11,989,010 B2* | 5/2024 | Michan | G05B 19/41865 |
| 12,031,733 B2* | 7/2024 | Herlocker | G06N 3/08 |
| 12,086,016 B2* | 9/2024 | Bertran | G06F 9/505 |
| 12,119,981 B2* | 10/2024 | Bisht | H04L 41/06 |
| 12,131,265 B2* | 10/2024 | Wang | G06N 20/00 |
| 2015/0033086 A1 | 1/2015 | Sasturkar et al. | |
| 2017/0192872 A1 | 7/2017 | Awad et al. | |
| 2019/0036795 A1* | 1/2019 | Ouyang | G06N 20/00 |
| 2019/0081969 A1 | 3/2019 | Phadke et al. | |
| 2019/0306011 A1* | 10/2019 | Fenoglio | H04L 41/16 |
| 2019/0356533 A1* | 11/2019 | Vasseur | G06N 20/00 |
| 2020/0084087 A1 | 3/2020 | Sharma et al. | |
| 2023/0291752 A1* | 9/2023 | Ben Slimen | H04L 41/145 |

FOREIGN PATENT DOCUMENTS

| | | | | |
|---|---|---|---|---|
| EP | 4120110 A1 * | 1/2023 | | G06F 11/0751 |
| WO | WO-2020242275 A1 * | 12/2020 | | G06N 20/00 |
| WO | WO-2022161607 A1 * | 8/2022 | | G06F 21/552 |
| WO | WO-2024165893 A1 * | 8/2024 | | H04L 41/142 |

OTHER PUBLICATIONS

Breunig et al. "LOF: Identifying Density-Based Local Outliers" Proceedings of the 2000 ACM SIGMOD International conference on Management of data, May 2000, 12 pages.

Ester et al., "A Density-Based Algorithm for Discovering Clusters in Large Spatial Databases with Noise" KDD-96 Proceedings, vol. 96, No. 34, Aug. 1996, 6 pages.

Fagin et al. "Optimal aggregation algorithms for middleware" Journal of Computer and System Sciences, 66(4), 2003, 43 pages.

Finnish Patent and Registration Office, Search Report, Application No. 20205605, mailed Feb. 2, 2021, 1 page.

The International Search Report and Written Opinion of the International Searching Authority, European Patent Office, Application No. PCT/FI2021/050402, mailed Aug. 4, 2021, 16 pages.

\* cited by examiner

301. Receive information about anomalies detected by an automated anomaly detection mechanism 302. Automatically determine certainty characteristics of the detected anomalies 303. Submit detected anomalies to expert evaluation in priority order determined based on the certainty characteristics of the detected anomalies 304. Use results of the expert evaluation: e.g. adjust determination of certainty characteristics, adjust the anomaly detection mechanism, perform root cause analysis

Fig. 3

401. A first, new anomaly detected

402. Expert evaluates the first anomaly a false positive

403. Adjustment of the anomaly detection mechanism delayed

404. The first anomaly recurs

405. Submit the first anomaly for re-evaluation

406. Adjust the anomaly detection mechanism based on results of the re-evaluation

Fig. 4

MONITORING OF TARGET SYSTEM, SUCH AS COMMUNICATION NETWORK OR INDUSTRIAL PROCESS

TECHNICAL FIELD

The present disclosure generally relates to automated monitoring of a target system, such as a communication network or an industrial process. The disclosure relates particularly, though not exclusively, to automated anomaly detection arrangements in the target system.

BACKGROUND

This section illustrates useful background information without admission of any technique described herein representative of the state of the art.

Cellular communication networks are complex systems comprising a plurality of cells serving users of the network. When users of the communication network move in the area of the network, connections of the users are seamlessly handed over between cells of the network. There are various factors that affect operation of individual cells and co-operation between the cells. In order for the communication network to operate as intended and to provide planned quality of service, cells of the communication network need to operate as planned. For example, the cells need to provide sufficient coverage without too much interfering with operation of neighboring cells.

In general, operation of the communication networks is continuously monitored and controlled in order to detect any problems in operation of the network as soon as possible so that operation of the network can be optimized. Various automated methods have been developed for this purpose to improve efficiency and accuracy. Many automated solutions still require human experts to evaluate and control automated actions. There is constant desire to further develop automated monitoring and control methods.

Anomaly detection method is a technique that can be employed in monitoring communication networks and detecting problems. Anomaly detection technique is commonly used for monitoring industrial processes. Same or similar anomaly detection solutions may be used in both target systems.

SUMMARY

The appended claims define the scope of protection. Any examples and technical descriptions of apparatuses, products and/or methods in the description and/or drawings not covered by the claims are presented not as embodiments of the present disclosure but as background art or examples useful for understanding the aspects of the disclosed embodiments.

According to a first example aspect of the disclosed embodiments there is provided a computer implemented method of monitoring a target system. The target system may be for example an industrial process or a communication network. The method comprises receiving information about anomalies in operation of the target system detected by an automated anomaly detection mechanism;

automatically determining certainty characteristics of the detected anomalies based on the received information;

submitting detected anomalies to expert evaluation in priority order determined based on the certainty characteristics; and adjusting the determination of certainty characteristics of the detected anomalies and/or the automated anomaly detection mechanism based on results of the expert evaluation.

In some example embodiments, the information about an anomaly comprises information specifying the anomaly. Alternatively, the information about an anomaly may comprise information specifying the anomaly accompanied with estimated root cause of the anomaly.

In some example embodiments, the method further comprises, responsive to the expert evaluation resulting in evaluating a first anomaly as true positive, performing automatic root cause analysis for the first anomaly.

In some example embodiments, the method further comprises submitting result of the automatic root cause analysis for further expert evaluation and using the result of the further expert evaluation for training the automatic root cause analysis.

In some example embodiments, the determination of certainty characteristics is based on one or more of the following: anomaly score of the detected anomaly, anomaly identification, information about statistical evidence of the detected anomaly, and novelty of the detected anomaly. That is, this information may be included in the information specifying the anomaly.

In some example embodiments, a new, previously unseen anomaly is given high priority in submitting to expert evaluation.

In some example embodiments, a rarely seen anomaly is given high priority in submitting to expert evaluation.

In some example embodiments, a recurring anomaly previously evaluated as false positive fulfils is given high priority in submitting to expert evaluation.

In some example embodiments, the certainty characteristics and the priority in submitting to expert evaluation are determined by giving the detected anomaly a base priority score based on anomaly score of the detected anomaly; increasing the base score, if there are similar other anomalies which have not received expert evaluation; and decreasing the base score, if there are similar other anomalies which have received expert evaluation. The detected anomalies can then be submitted to expert evaluation in the order defined by the priority score.

In some example embodiments, the certainty characteristics and the priority in submitting to expert evaluation are determined based on anomaly score of the detected anomaly and number of similar detected anomalies in the neighborhood of the detected anomaly.

In some example embodiments, the certainty characteristics and the priority in submitting to expert evaluation are determined based on determining whether the detected anomaly is associated with anomalous behavior in certain predefined variables.

In some example embodiments, the certainty characteristics and the priority in submitting to expert evaluation are determined based on increasing priority for anomalies detected in regions of a measurement space where the density of labeled anomalies is low.

In some example embodiments, the certainty characteristics and the priority in submitting to expert evaluation are determined based on increasing priority for anomalies detected in regions of a measurement space where the density of all, labeled or unlabeled, anomalies is high.

In some example embodiments, the results of the expert evaluation are used by analyzing anomaly confirmed/rejected labels given by an expert;

giving variables of the target system scores indicating how often they are involved in positively confirmed anomalies; and based on the scores, giving higher weight to those variables that are associated with confirmed anomalies and giving lower weight to those variables that are associated with rejected anomalies; and providing the weights for use in analyzing later detected anomalies.

In some example embodiments, the certainty characteristics and the priority in submitting to expert evaluation are determined based on applying time-decay to the certainty characteristics. For example, new detected anomalies are given full weight in priority determination, and the weight is decreased as time passes since detecting the anomaly.

In some example embodiments, the certainty characteristics and the priority in submitting to expert evaluation are determined based on merging a plurality of certainty characteristics.

According to a second example aspect of the disclosed embodiments, there is provided an apparatus comprising a processor and a memory including computer program code; the memory and the computer program code configured to, with the processor, cause the apparatus to perform the method of the first aspect or any related embodiment.

According to a third example aspect of the disclosed embodiments, there is provided a computer program comprising computer executable program code which when executed by a processor causes an apparatus to perform the method of the first aspect or any related embodiment.

According to a fourth example aspect of the disclosed embodiments there is provided a computer program product comprising a non-transitory computer readable medium having the computer program of the third example aspect stored thereon.

According to a fifth example aspect of the disclosed embodiments there is provided an apparatus comprising means for performing the method of the first aspect or any related embodiment.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which:

FIGS. 3-4 show flow diagrams illustrating example methods according to certain embodiments.

DETAILED DESCRIPTION

Figure 1:
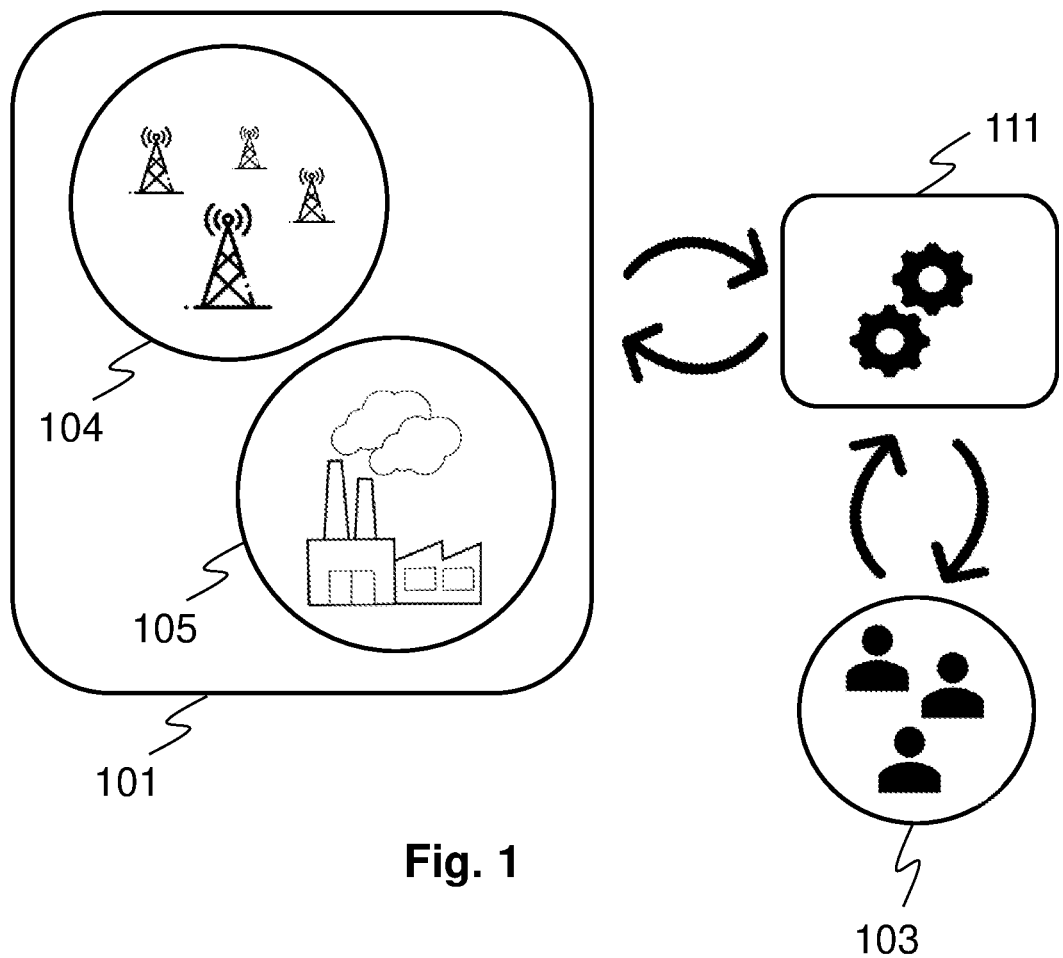
FIG. 1 schematically shows an example scenario according to an example embodiment.

In the following description, like reference signs denote like elements or steps.

Embodiments of present disclosure can be used in the context of automated monitoring and control of industrial processes or communication networks or other complex target systems. The automated monitoring and control methods may be based on artificial intelligence and machine learning technologies. The methods are often based on iterations of machine generated suggestions of changes or actions and expert evaluation/adjustment of the suggestions. Expert evaluation/adjustment provides feedback to the automation to improve the machine generated suggestions.

Present disclosure relates to automated monitoring associated with automated anomaly detection. Anomaly detection refers to identification of data points, items, observations, events or other variables that do not conform to an expected pattern of a given data sample or data vector. There are various statistical methods that can be used in anomaly detection. Such methods include for example principal component analysis (PCA), independent component analysis, autoencoder, one-class support vector machine, clustering method, and others. Still further, prediction error monitoring can be used for anomaly detection. In such case, a prediction model is developed for time series data and prediction error of the model is monitored. Statistically large prediction error can be considered to be an indication of an anomaly.

Root cause analysis aims at identifying reason for a detected anomaly, i.e. problem causing the anomaly. Possibly also a correction for solving the identified problem may be determined. Automatic root cause analysis can be performed based on history of earlier detected faults or anomalies and the root causes they have been classified to be associated with.

In complex systems, such as communication networks and/or industrial processes, with large natural variation, anomaly detection methods tend to also indicate cases that are false positives (statistical flukes or noise rather than true anomalies). If anomaly detection system is very strict in raising anomalies, anomalies are raised only after significant statistical evidence has been gathered. In this way, the raised anomalies are likely true anomalies. On the other hand, new true anomalies are not easily detected. If anomaly detection system is loose in raising anomalies, new true anomalies are detected early but they can be crowded out by false positives.

Some example embodiments of present disclosure provide automatic determination of certainty characteristics of anomalies that have been detected by automated anomaly detection mechanisms and anomalies with certain certainty characteristics are submitted for expert evaluation before acted on. In this way, loose standards (anomaly raised with relatively little statistical evidence) can be employed in anomaly detection mechanisms without causing continuous changes and unnecessary corrective actions in the system.

On the other hand, by not submitting all detected anomalies to expert evaluation, one achieves that experts are not flooded with evaluating anomalies that have high likelihood of being true positive detections.

It is to be noted that in the following, a single anomaly may be discussed, but clearly plurality of detected anomalies can be processed correspondingly in parallel or sequentially one after another. Likewise, a single anomaly detection mechanism is in general discussed, but plurality of different anomaly detection mechanisms may be equally used.

FIG. 1 schematically shows an example scenario according to an embodiment. The scenario shows a target system 101 and an automation system 111. The target system may be a communication network 104 comprising a plurality of cells and base stations and other network devices, or an industrial process 105. Further, the scenario shows The automation system 111 is configured to implement automated monitoring of operation of the target system 101. The automation system 111 is operable to interact with the target system 101 to receive data and to adjust operation of the target system 101. In an embodiment, the automation system for example receives performance data from an operations support system OSS of the communication network 104 and provides modified or new parameter values and configurations to the OSS for use in the communication network 104. Likewise, the automation system may receive performance data (for example sensor data or other metrics) from the industrial process 105.

Still further, the scenario of FIG. 1 shows a group of experts 103. The automation system 111 is operable to provide an interface through which one or more of the experts 103 can evaluate and adjust operation of the automation system 111 and actions automatically generated in the automation system 111.

The automation system 111 is operable to implement an automatic anomaly detection mechanism and to process output of the automatic anomaly detection mechanism according to at least some example embodiments of present disclosure.

In an embodiment of the invention the scenario of FIG. 1 operates as follows: The automation system 111 receives performance data from the target system 101. The data is automatically analysed by the automatic anomaly detection mechanism of the automation system 111. The automation system 111 processes the output of the automatic anomaly detection mechanism and selectively submits some of the anomalies detected by the automatic anomaly detection mechanism for evaluation by one or more of the experts 103. Based on the result of the expert evaluation the automation system 111 may adjust processing of the output of the automatic anomaly detection mechanism and/or the automation system 111 may adjust the automatic anomaly detection mechanism.

In connection with communication network examples, the anomalies detected by the automatic anomaly detection mechanism may indicate that the communication network 104 has problems with one or more of the following: overshoot, interference, congestion, coverage etc. In connection with industrial process examples, the performance data may comprise multivariate time series data on continuous production processes and the anomalies detected by the automatic anomaly detection mechanism may indicate that the industrial process has problems with one or more of the following: undesired changes in the production process, failures in certain part of the production run, failures in quality inspection.

The automation system 111 may further perform automatic root cause analysis for the detected anomalies and generate suggestions of changes to be performed in the target system 101 to overcome the detected problems e.g. by changing parameter values, modifying configuration and/or making changes in system equipment.

The generated suggestions of changes may be provided for evaluation by one or more of the experts 103, too. The expert may approve or disapprove the changes. The automation system 111 conveys the approved changes to be implemented in the target system 101.

The process of detecting anomalies and processing detected anomalies may be continuous, whereby the target system is continuously monitored.

Figure 2:
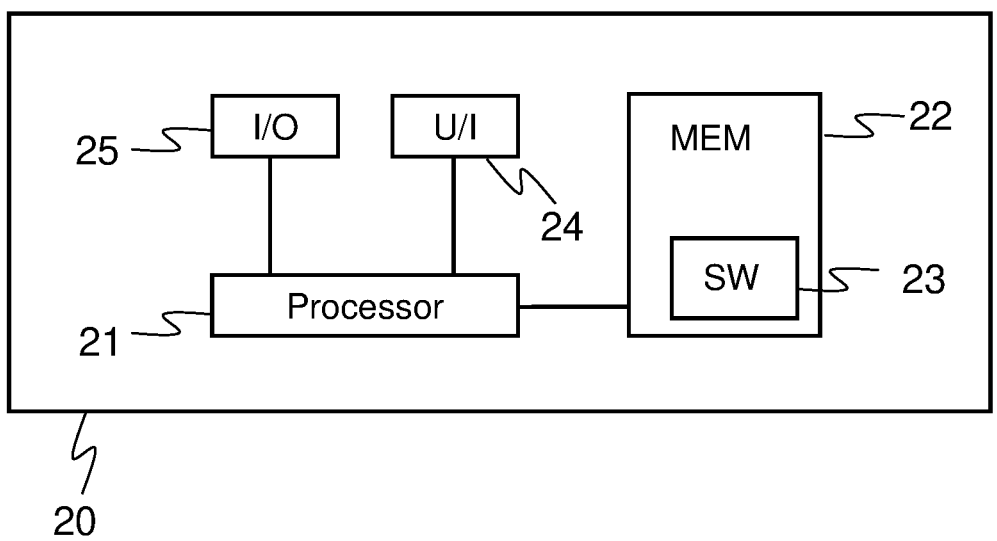
FIG. 2 shows a block diagram of an apparatus according to an example embodiment.

FIG. 2 shows a block diagram of an apparatus 20 according to an embodiment. The apparatus 20 is for example a general-purpose computer or server or some other electronic data processing apparatus. The apparatus 20 can be used for implementing at least some embodiments of the invention. That is, with suitable configuration the apparatus 20 is suited for operating for example as the automation system 111 or the expert profile module 112 of foregoing disclosure.

The apparatus 20 comprises a communication interface 25; a processor 21; a user interface 24; and a memory 22. The apparatus 20 further comprises software 23 stored in the memory 22 and operable to be loaded into and executed in the processor 21. The software 23 may comprise one or more software modules and can be in the form of a computer program product.

The processor 21 may comprise a central processing unit (CPU), a microprocessor, a digital signal processor (DSP), a graphics processing unit, or the like. FIG. 2 shows one processor 21, but the apparatus 20 may comprise a plurality of processors.

The user interface 24 is configured for providing interaction with a user of the apparatus. Additionally or alternatively, the user interaction may be implemented through the communication interface 25. The user interface 24 may comprise a circuitry for receiving input from a user of the apparatus 20, e.g., via a keyboard, graphical user interface shown on the display of the apparatus 20, speech recognition circuitry, or an accessory device, such as a headset, and for providing output to the user via, e.g., a graphical user interface or a loudspeaker.

The memory 22 may comprise for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories. The memory 22 may serve the sole purpose of storing data, or be constructed as a part of an apparatus 20 serving other purposes, such as processing data.

The communication interface 25 may comprise communication modules that implement data transmission to and from the apparatus 20. The communication modules may comprise a wireless or a wired interface module(s) or both. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. The communication interface 25 may support one or more different communication technologies. The apparatus 20 may additionally or alternatively comprise more than one of the communication interfaces 25.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like. Further, it is noted that only one apparatus is shown in FIG. 2, but the embodiments of the invention may equally be implemented in a cluster of shown apparatuses.

FIGS. 3-4 show flow diagrams illustrating example methods according to certain embodiments. The methods may be implemented in the automation system 111 of FIG. 1 and/or in the apparatus 20 of FIG. 2. The methods are implemented in a computer and do not require human interaction unless otherwise expressly stated. It is to be noted that the methods may however provide output that may be further processed by humans and/or the methods may require user input to start. Different phases shown in the flow diagrams may be combined with each other and the order of phases may be changed except where otherwise explicitly defined. Furthermore, it is to be noted that performing all phases of the flow diagrams is not mandatory.

The method of FIG. 3 provides monitoring and controlling of a target system, such as a communication network or an industrial process, and comprises the following phases:

301: Information is received about anomalies detected by an automated anomaly detection mechanism. The anomaly detection method may be for example principal component analysis (PCA), independent component analysis, autoencoder, one-class support vector machine, clustering method, prediction error monitoring or some other anomaly detection method.

In an embodiment, information about anomalies may be compared to event or maintenance log to see if the anomalies are likely associated with changes, such as maintenance actions, performed in the target system. If there is log indicating such changes, the anomalies can be considered to be a consequence of the changes and may be disregarded. That is, the anomalies are not processed any further and the process stops.

In an embodiment, the information about an anomaly comprises information specifying the detected anomaly. In another embodiment, the information about an anomaly comprises information specifying the detected anomaly accompanied with estimated root cause of the detected anomaly. The information about an anomaly may comprise anomaly score of the detected anomaly, anomaly identification, information about statistical evidence or commonness of the detected anomaly, and/or information about novelty of the detected anomaly.

302: Certainty characteristics of the detected anomalies are automatically determined based on the received information. The determination may be based on one or more of the following: anomaly score of the detected anomaly, anomaly identification, information about statistical evidence and commonness of the detected anomaly, and novelty of the detected anomaly. That is, this information may be included in the received information specifying the anomaly. Anomaly score of the detected anomaly can be seen as specifying uncertainty/certainty of the anomaly detection. Anomaly identification may refer to information on how each of the monitored variables (or key performance indicators) of the target system contribute to anomaly score of the detected anomaly. Information about statistical evidence or commonness of the detected anomaly may be provided for example by using clustering methods. Novelty of the detected anomaly may be provided for example by using local outlier factor method or density estimates.

303: Detected anomalies are selectively submitted to expert evaluation in priority order determined based on respective certainty characteristics of the detected anomalies. Detected anomalies associated with highest uncertainty (or lowest certainty) are given highest priority in seeking expert evaluation or confirmation of the anomaly observation. In general, likelihood of the detected anomaly being a true positive observation is evaluated. Anomalies that are considered to be true positives with strong likelihood receive relatively low priority in seeking expert evaluation. These are not necessarily submitted for expert evaluation at all. Less reliably detected anomalies on the other hand receive higher priority in seeking expert evaluation to confirm whether they are true positive or false positive observations.

Additionally or alternatively, detected anomalies that fulfil certain predefined certainty characteristics may be always submitted to expert evaluation. That is, there may be predefined certainty characteristics that always receive high priority in seeking expert evaluation. For example, a recurring anomaly, which was previously evaluated as false positive by an expert may be considered to fulfil such predefined certainty characteristics. That is, if an anomaly was previously evaluated as false positive by an expert, but the anomaly detection later collects further statistical evidence indicating that the anomaly might nevertheless be true positive, the anomaly with further statistical evidence receives high priority in seeking expert evaluation. Additionally or alternatively, a new, previously unseen anomaly may be considered to fulfil the predefined certainty characteristics. Additionally or alternatively, a rarely seen anomaly may be considered to fulfil the predefined certainty characteristics.

304: The results of the expert evaluation are used. In an embodiment, the results are used for adjusting the determination of certainty characteristics of the detected anomalies. For example, responsive to the expert evaluation resulting in evaluating a first anomaly as true positive, the determination of certainty characteristics may in future consider corresponding anomalies as true positives without expert evaluation or give such anomalies a very low priority in seeking further expert evaluation.

Additionally or alternatively, the results are used for adjusting the automated anomaly detection mechanism. For example, responsive to the expert evaluation resulting in evaluating a first anomaly as false positive, the automated anomaly detection mechanism may be taught to not raise such anomaly in future. However, more than one false positive evaluation may be required for taking this action. In such case a detected anomaly that is considered false positive as a result of the expert evaluation, may be put on hold before acted on to see if the same anomaly recurs later and to see if treating the later occurring anomaly confirms the previous finding. Such example is discussed in more detail later.

Additionally or alternatively, the results are used for deciding about performing root cause analysis for the detected anomaly. For example, responsive to the expert evaluation resulting in evaluating a first anomaly as true positive, automatic root cause analysis may be performed for the first anomaly. The results of the automatic root cause analysis may be further submitted for expert evaluation. The result of the automatic root cause analysis may be uncertain and in such case expert evaluation is beneficial. The results of the expert evaluation may be then used for training the automatic root cause analysis to improve analysis of future anomalies. For example, the automatic root cause evaluation may be unable to distinguish between two different, but equally possible root causes for a certain anomaly. In such case, it is beneficial to obtain additional training data (classification of anomalies to respective root cause) from expert evaluation.

The method of FIG. 4 provides an example of analyzing detected anomalies, and comprises the following phases:

401: A first anomaly is detected by an automated anomaly detection mechanism and information about this is received. The first anomaly is a new anomaly and consequently the first anomaly is submitted for expert evaluation.

402: The expert evaluation results in the expert evaluating the first anomaly to be a false positive observation.

403: The result of the evaluation could be used for adjusting the automated anomaly detection mechanism, but this is delayed as more than one corresponding evaluation result is needed for performing adjustment of the automated anomaly detection mechanism. That is, the first evaluation of the first, new anomaly is not considered final, but a further confirmation is required.

404: The first anomaly recurs and information about this is received. This second detection of the first anomaly may require that further statistical evidence is gathered compared to the statistical evidence resulting in raising the first anomaly for the first time.

405: The first anomaly is submitted for re-evaluation by one or more experts. The re-evaluation results in the first anomaly to be again evaluated as a false positive observation.

406: The anomaly detection mechanism is adjusted.

It is to be noted that the re-evaluation in phase 405 may alternatively result in the first anomaly being evaluated as a true positive, i.e. the evaluation results in phases 402 and 405 differ from each other. In such case, any action to be taken may be further delayed until the first anomaly is again re-evaluated.

The following discusses some example implementation details for performing the determination of certainty characteristics and prioritizing expert evaluation of detected anomalies for example in phases 302 and 303 of FIG. 3. The determination of the certainty characteristics and the prioritization may results in assigning a priority score to the detected anomalies. Depending on the implementation details certain priority scores exceeding some limit may be considered to indicate high priority, while some other priority scores indicate low priority or mediocre priority.

Case 1: A detected anomaly receives a base priority score based on anomaly score. The base score is increased if there are similar other anomalies which have not received expert evaluation. Base score is decreased if similar other anomalies have received expert evaluation. Calculation of similarity can be performed on the basis of on distance metric calculated from process/performance measurements of the detected anomaly.

Case 2: The certainty characteristics and the prioritization are determined based on anomaly score and the number of similar detected anomalies in the neighborhood (statistical evidence/commonness, can be obtained by clustering with a suitable distance metric). This information is combined with the labels of the data points (i.e. detected anomalies) in the cluster: if the cluster has no labels or if there is one early negative label assigned by an expert, the data points in the cluster receive high priority. Moreover, data points within a cluster can be prioritized based on their location in the cluster so that we get expert feedback for points in the center and on the expected boundaries of the cluster (using the locations of other clusters as a reference). In this way, it can be possible to avoid having to label all data points in the cluster. Suitable clustering methods for detecting new clusters include DBSCAN, OPTICS and hierarchical clustering methods (not exhaustive list). DBSCAN is discussed for example in Ester, M., Kriegel, H. P., Sander, J., & Xu, X. (1996 August): A density-based algorithm for discovering clusters in large spatial databases with noise; Kdd (Vol. 96, No. 34, pp. 226-231). OPTICS is discussed for example in Ankerst, M., Breunig, M. M., Kriegel, H. P., & Sander, J. (1999): OPTICS: ordering points to identify the clustering structure; *ACM Sigmod record,* 28(2), 49-60.

Case 3: The certainty characteristics and the prioritization are determined based on novelty of the detected anomaly. Detected anomalies that are considered new (as indicated by the novelty score) always receive high or highest prioritization in order to get early expert feedback. Novelty of the detected anomaly can be determined with the local outlier factor method, density estimation or as by-product of some clustering methods such as DBSCAN or OPTICS. Local outlier factor method is discussed for example in Breunig, M. M., Kriegel, H. P., Ng, R. T., & Sander, J. (2000 May). LOF: identifying density-based local outliers; *Proceedings of the* 2000 *ACM SIGMOD international conference on Management of data* (pp. 93-104). This case can be combined with the method of case 2, for example.

Case 4: The certainty characteristics and the prioritization are determined based on determining whether the detected anomaly is associated with anomalous behavior in certain predefined variables (as indicated by identification methods) get high prioritization. In this way the expert's attention can be directed to the most critical types of anomalies. This case can be combined with the method of case 2, for example.

Case 5: The certainty characteristics and the prioritization are determined based on increasing priority for anomalies detected in regions of the measurement space where the density of labeled data points is low.

Case 6: The certainty characteristics and the prioritization are determined based on increasing priority for anomalies detected in regions of the measurement space where the density of all (labeled or unlabeled) data points is high.

Case 7: The certainty characteristics and the prioritization are determined based on merging several different rankings to obtain N data points (or detected anomalies) with highest priority, using for example Fagin's algorithm or the Threshold algorithm. Fagin's algorithm and the Threshold algorithm are discussed for example in Fagin, R., Lotem, A., & Naor, M. (2003): Optimal aggregation algorithms for middleware; *Journal of computer and system sciences,* 66(4), 614-656.

Case 8: The results of the expert evaluation are used as follows:
  a. Labels (anomaly confirmed/rejected) given by expert are analysed.
  b. Variables of the target system are given scores indicating how often they tend to be involved in positively confirmed anomalies, for example, by examining how the contribution plots of the variables behave for confirmed/rejected anomalies. For example, a classification model that uses as an input the contributions or derivatives thereof can be used for this purpose.
  c. Based on the scores, those variables that are associated with confirmed anomalies are given higher weight (if that variable is significant in contribution plot of new anomaly candidate), and those variables that are only associated with rejected anomalies are given lesser weight (if that variable is significant in contribution plot of new anomaly candidate).
  d. The weights can then be used in analyzing later detected anomalies.

Case 9: For automated root cause analysis, uncertainty of the automated root cause analysis can be used to select next data points (detected anomalies and associated root cause) to get expert feedback. Uncertainty of the automated root cause analysis can be quantified as the entropy of label probabilities from the output of the root cause analysis. Here, too, novel data points can be given high priority.

Case 10: The methods of other herein discussed cases can have time-decay applied to them, for example, in the following manner: new observations (detected anomalies) have full weight, but the weight of any observation decreases as the time passed since observation happened increases.

It is to be noted that, in addition to the specifically mentioned combination of cases, also other combinations of herein discussed cases can be used.

Without in any way limiting the scope, interpretation, or application of the appended claims, a technical effect of one or more of the example embodiments disclosed herein is improvement in automated monitoring and control arrangements achieved by interactive arrangement of automatic actions and expert evaluation of the output of the automatic actions. Automatic determination of certainty characteristics of the detected anomalies and prioritization based on the certainty characteristics provides that the amount of cases submitted for expert evaluation can be kept reasonable while at the same time anomaly detection may apply loose standards in raising anomalies.

If desired, the different functions discussed herein may be performed in a different order and/or concurrently with each other. Furthermore, if desired, one or more of the before-described functions may be optional or may be combined Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the aspects of the disclosed embodiments. It is however clear to a person skilled in the art that the present disclosure not restricted to details of the embodiments presented in the foregoing, but that it can be implemented in other embodiments using equivalent means or in different combinations of embodiments without deviating from the characteristics of the present disclosure.

Furthermore, some of the features of the afore-disclosed example embodiments may be used to advantage without the corresponding use of other features. As such, the foregoing description shall be considered as merely illustrative of the principles of the present disclosure, and not in limitation thereof. Hence, the scope of the aspects of the disclosed embodiments only restricted by the appended patent claims.

The invention claimed is:

1. A computer implemented method of monitoring a target system, the method comprising:
   receiving information about anomalies in operation of the target system detected by an automated anomaly detection mechanism;
   automatically determining certainty characteristics of the detected anomalies based on the received information;
   submitting detected anomalies to expert evaluation in priority order determined based on the certainty characteristics, wherein detected anomalies with highest uncertainty are given highest priority; and
   adjusting the determination of certainty characteristics of the detected anomalies and/or the automated anomaly detection mechanism based on results of the expert evaluation.

2. The method of claim 1, wherein information about an anomaly comprises information specifying the anomaly or information specifying the anomaly accompanied with estimated root cause of the anomaly.

3. The method of claim 1, further comprising, responsive to the expert evaluation resulting in evaluating a first anomaly as true positive, performing automatic root cause analysis for the first anomaly.

4. The method of claim 3, further comprising submitting result of the automatic root cause analysis for further expert evaluation and using the result of the further expert evaluation for training the automatic root cause analysis.

5. The method of claim 1, wherein the determination of certainty characteristics is based on one or more of the following: anomaly score of the detected anomaly, anomaly identification, information about statistical evidence of the detected anomaly, and novelty of the detected anomaly.

6. The method of claim 1, wherein a new, previously unseen anomaly is given high priority in submitting to expert evaluation.

7. The method of claim 1, wherein a rarely seen anomaly is given high priority in submitting to expert evaluation.

8. The method of claim 1, wherein a recurring anomaly previously evaluated as false positive is given high priority in submitting to expert evaluation.

9. The method of claim 1, wherein the certainty characteristics and the priority in submitting to expert evaluation are determined by giving the detected anomaly a base priority score based on anomaly score of the detected anomaly; increasing the base score, if there are similar other anomalies which have not received expert evaluation; and decreasing the base score, if there are similar other anomalies which have received expert evaluation.

10. The method of claim 1, wherein the certainty characteristics and the priority in submitting to expert evaluation are determined based on anomaly score of the detected anomaly and number of similar detected anomalies in the neighborhood of the detected anomaly.

11. The method of claim 1, wherein the certainty characteristics and the priority in submitting to expert evaluation are determined based on determining whether the detected anomaly is associated with anomalous behavior in certain predefined variables.

12. The method of claim 1, wherein the target system is an industrial process.

13. The method of claim 1, wherein the target system is a communication network.

14. An apparatus comprising:
    a processor, and
    a memory including computer program code; the memory and the computer program code configured to, with the processor, cause the apparatus to perform;
    receiving information about anomalies in operation of the target system detected by an automated anomaly detection mechanism;
    automatically determining certainty characteristics of the detected anomalies based on the received information;
    submitting detected anomalies to expert evaluation in priority order determined based on the certainty characteristics, wherein detected anomalies with highest uncertainty are given highest priority; and
    adjusting the determination of certainty characteristics of the detected anomalies and/or the automated anomaly detection mechanism based on results of the expert evaluation.

15. A computer program embodied on a non-transitory computer readable medium with computer executable program code which when executed by a processor causes an apparatus to perform:

receiving information about anomalies in operation of the target system detected by an automated anomaly detection mechanism;

automatically determining certainty characteristics of the detected anomalies based on the received information;

submitting detected anomalies to expert evaluation in priority order determined based on the certainty characteristics, wherein detected anomalies with highest uncertainty are given highest priority; and adjusting the determination of certainty characteristics of the detected anomalies and/or the automated anomaly detection mechanism based on results of the expert evaluation.

16. The method of claim 1, wherein detected anomalies with highest uncertainty are given highest priority.

17. The apparatus of claim 14, wherein detected anomalies with highest uncertainty are given highest priority.

18. The apparatus of claim 14, wherein a new, previously unseen or rarely seen anomaly is given high priority in submitting to expert evaluation.

19. The method of claim 14, wherein a recurring anomaly previously evaluated as false positive is given high priority in submitting to expert evaluation.

20. The apparatus of claim 14, wherein the certainty characteristics and the priority in submitting to expert evaluation are determined by giving the detected anomaly a base priority score based on anomaly score of the detected anomaly; increasing the base score, if there are similar other anomalies which have not received expert evaluation; and decreasing the base score, if there are similar other anomalies which have received expert evaluation.

* * * * *